United States Patent
Bashkansky et al.

(10) Patent No.: US 6,820,264 B1
(45) Date of Patent: Nov. 16, 2004

(54) DATA GATHER/SCATTER MACHINE

(75) Inventors: Guy Bashkansky, Haifa (IL); Sergei Shmulyian, Givataim (IL); Ron Sivan, Haifa (IL); Richard R. Treumann, Highland, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/517,167

(22) Filed: Mar. 2, 2000

(51) Int. Cl.[7] .................................. G06F 15/163
(52) U.S. Cl. ............................ 719/310; 707/100
(58) Field of Search .......................... 719/310

(56) References Cited

U.S. PATENT DOCUMENTS

| | | | |
|---|---|---|---|
| 4,949,255 A | | 8/1990 | Gerth et al. |
| 5,276,878 A | | 1/1994 | Sutton et al. |
| 5,608,906 A | | 3/1997 | Tonouchi et al. |
| 5,721,895 A | * | 2/1998 | Velissaropoulos et al. ......... 707/104.1 |
| 5,778,223 A | * | 7/1998 | Velissaropoulos et al. .. 707/100 |
| 5,862,340 A | | 1/1999 | Reynolds |
| 6,105,075 A | * | 8/2000 | Ghaffari .................. 710/5 |

OTHER PUBLICATIONS

Draft document for the Real–time Message Passing Interface (MPI/RT), Nov. 3, 1997 , p. 80.*
Draft Document for the Real–time Meassage Passing Interface( MPI/RT), Jan. 12, 1998.*
Ewing Lusk et al ,MPI–2: Extensions to the Message–Passing Interface, 1997, the University of Tennessee.*
John L. Hennessy, Computer Architecture, 1995, Technology /computer Architecture.*
Gropp et al., "Improving the Performance of MPI Derived Datatypes", 6 pages.
"Derived datatypes" http://www.mpi–forum.org/docs/mpi–11–html/node54.html, pp. 1–3.
"Datatype constructors" http://www.mpi–forum.org/docs/mpi–11–html/node55.html, pp. 1–9.

* cited by examiner

*Primary Examiner*—Sue Lan
*Assistant Examiner*—LeChi Truong
(74) *Attorney, Agent, or Firm*—Lawrence D. Cutter; Lane Aitken & McCann (57) ABSTRACT

An embodiment of the present invention is directed to a method for compiling, storing, and interpreting, as often as needed, a representation of any MPI datatype, including the steps of compiling a tree representation of an MPI datatype into a compact, linear data gather scatter program (DGSP) wherein the DGSP is of a form general enough to encode an arbitrarily complex datatype, registering the compact linear DGSP with a communications subsystem for later interpretation by the subsystem for at least one of sends, receives, packs and unpacks, creating a registered DGSP, and interpreting the registered DGSP. In one embodiment of the present invention, the form of the DGSP uses a single generalized representation. In another embodiment the single generalized representation covers any of the arbitrarily complex datatype patterns that can arise in this context. In yet another embodiment, the single generalized representation provides that any datatype that can be constructed using an application programming interface (API) in MPI can be converted into the form.

16 Claims, 4 Drawing Sheets

DATA GATHER/SCATTER MACHINE

FIELD OF THE INVENTION

The invention relates to multiprocessor computers and more particularly to a message passing interface (MPI) application programming interface (API) for passing messages between multiple tasks or processes.

TRADEMARKS

S/390 and IBM are registered trademarks of International Business Machines Corporation, Armonk, N.Y., U.S.A. and Lotus is a registered trademark of its subsidiary Lotus Development Corporation, an independent subsidiary of International Business Machines Corporation, Armonk, N.Y. Other names may be registered trademarks or product names of International Business Machines Corporation or other companies.

BACKGROUND

Message Passing Interface (MPI) defines a standard application programming interface (API) for using several processes at one time to solve a single large problem called a "job" on a multiprocessor and often multi-node computer (i.e., commonly one process per node). Each job can include multiple processes. A process can also commonly be referred to as a task. Each process or task can compute independently except when it needs to exchange data with another task. The program passes the data from one task to another as a "message." Examples of multiprocessor computers are, e.g., an IBM RISC System 6000/SP available from IBM Corporation, Armonk, N.Y., and supercomputers available from Cray, Silicon Graphics, Hewlett Packard, Thinking Machines, and the like.

Specifically, a programmer can use an explicit MPI_SEND to identify what data from the memory of the source task is to be sent as a given message. The programmer can also use an explicit MPI_RECV at the destination task to identify where the data is to be placed in the receiver memory.

In conventional message passing, a send or receive call would identify a memory address and byte count. This is restrictive because it is common for the content which logically comprises a message to be discontiguous in memory.

The conventional approach is, however, a neat fit to the lower level transport model which treats data to be moved between tasks as byte streams.

The conventional solutions have been to send a distinct message for each contiguous unit, or to allocate a scratch buffer and copy or pack the discontiguous data into the scratch buffer before sending. These techniques add programmer burden and execution time overhead.

For example, in a 10×10 matrix of integers, M, stored row major, a row is 10 contiguous integers but a column is every 10th integer. The programmer with a row to send could exploit the fact that the data was already contiguous and could use a simple send. Conventionally, the programmer with a column to send would need to use one of the more awkward techniques. Similar considerations apply to a receive where the eventual destination of the data may not be contiguous.

To simplify the description which follows, sending of messages will be focused upon although the same would apply to the receiving of messages. To send a message, data is gathered from memory and fed to the transport layer at the rate that the transport layer is able to accept. Bytes of a message are forwarded in chunks and the transport layer dictates the size of each chunk. When the transport layer is ready to accept N bytes, then N bytes are copied from the proper memory locations into the transport (pipe) buffer. The data gather logic delivers a specific number of bytes at each activation and then at the next activation, picks up where it left off to deliver more bytes.

Receiving a message is a mirror image of the sending of one. Some number of bytes becomes available from a pipe and must be distributed. It would be apparent to those skilled in the art that the concepts involved in sending and receiving are so closely related that to understand one is to understand the other.

The MPI standard addresses the problem of dealing with discontiguous memory data by defining a set of calls which enable the programmer to describe any possible layout of data in memory. It then falls to the MPI implementation to gather data and feed it to the transport layer or receive incoming data and scatter it to user task memory. The description is called an MPI_Datatype and can be visualized as a template with a stride and one or more tupples, each tupple representing a data unit and its offset within the template. For the 10×10 integer matrix, M, mentioned above, assume it is desirable to send a single message taking the first and sixth integer of each row. In conventional message passing a 20 integer long buffer could be allocated and a loop could be coded to copy these 20 integers from their locations in M to the scratch buffer. Then 80 bytes could be sent from the scratch buffer. In MPI, an MPI_Datatype can be defined called, for example, "newtype" to indicate the first and sixth integer of each row: {(0,integer) (20,integer) stride=40} then call MPI_SEND(M,10, newtype, . . . ). The MPI implementation interprets the template 10 times to gather and transmit the 80 bytes.

MPI offers a set of predefined datatypes and a set of constructor calls which allow user-defined datatypes to be built based on the predefined types plus any previously defined user types. Since any new datatype is defined in terms of previously defined types, the natural representation to flow from a sequence of type constructor calls is a tree with predefined types as leaves and user defined types as internal nodes. MPI implementations use such trees to record the datatypes created in a user's code. To gather data to MPI_SEND 10 of "newtype", an MPI implementation would traverse the tree representing "newtype" 10 times. Most implementations of MPI allocate a temporary buffer large enough for the entire message and do an entire gather at one time and then send from the temporary buffer. A different implementation uses an approach which gathers in increments and which preserves the state of the gather operation from step to step. Like the former implementations, the latter implementation has depended on traversing the tree as many times as needed.

The current approach has several limitations. The MPI standard (MPI-1) was initially defined in a way which allowed all MPI_Datatype information to be local. If two tasks wish to communicate, each task makes its own type constructor calls and each task produces, its own tree-encoded description of a datatype. The sending task would "gather" based on the MPI_SEND type description and the data would flow to the destination which would "scatter" according to the MPI_RECV type description. The programmer constructs datatypes for the MPI_SEND and matching MPI_RECV which were compatible but neither task would have any access to the description used at the other end. Describing a datatype with a tree is adequate (though not ideal) when the description can remain local.

With MPI-2, the MPI standard was extended with features which depend on it being possible for a datatype which is constructed at one task to be sent to another for interpretation at the remote task.

One of the extended features is a one sided communication in which an origin task uses a call, such as, e.g., an MPI_PUT which specifies a first datatype to be used for the local "gather" as well as a second datatype to be used for the "scatter" at the target task. Both datatypes used in the MPI_PUT call are local to the task which calls MPI_PUT but the semantic of the call is as if the origin did an MPI_SEND with the first datatype and the target did a matching MPI_RECV with the second. To produce this semantic, the type description which is available at the origin is packaged and sent to the target in a form which the target task can interpret. One sided communication can include an additional complication in the MPI_ACCUMULATE function. An accumulate is like an MPI_PUT except that at the target, each unit of data which arrives (such as, e.g., integer, 4 byte floating point, 8 byte floating point etc.) can be combined with the data already present by some reduction function (such as, e.g., add, multiply and bit-and).

Another extended feature is MPI-IO which allows MPI programs to treat files as if they were organized using MPI_Datatypes. Like one sided communication, MPI-IO uses encapsulation of the description of an MPI_Datatype at one task and sends it to another for interpretation.

A tree structure is inherently local because its nodes are each represented by some unit of memory and the edges between the nodes are pointers. It is not practical to copy a tree structure from one task's memory to another task's memory. Even when the tree is local, it is likely to be an inefficient use of processor data cache to traverse the tree, loading type description data from widely scattered tree nodes. It would be desirable for the essential information to be abstracted into a compact and portable form.

Participants in the MPI Forum (i.e., the standards body that defined the MPI standard) are aware of the problem sought to be solved by the present invention. A conventional solution to the problem exists but the conventional solution becomes impractical upon scaling. The MPI standard indicates that any message can be fully described by its "type map". The type map for a message has a "tupple" (i.e., {offset, type}) for each data item in the message. The type map for an array of 3 integers can be, e.g., ({0,int} {4,int} {8,int}). While a type map can be fully expressive, fully accurate and portable, the type map can become quickly useless because it can become to big when, e.g., a message of 1,000,000 integers is considered. The message of 1,000,000 integers would require a 1,000,000 tupple type map. If this 1,000,000 tupple type map needs to be sent to another task before the message can be sent, the cost can become prohibitive. Real but complex datatypes are often expressible in an affordable type map. Large but simple types can be expressible by a simple, compact formula. However, no one has devised a scheme which matches the expressive power of the MPI datatype constructor facility. Attempts to recognize common patterns and using a different encoding for each different common pattern have fallen short. Alternative implementations to the solution of the present invention fall back to using flat type maps when the type does not fit a neat category. It is desired that an improved scheme, matching the expressive power of the MPI datatype constructor facility be provided.

SUMMARY

An embodiment of the present invention is directed to a method for compiling, storing, and interpreting, as often as needed, a representation of any MPI datatype, including the steps of compiling a tree representation of an MPI datatype into a compact, linear data gather scatter program (DGSP) wherein the DGSP is of a form general enough to encode an arbitrarily complex datatype, registering the compact linear DGSP with a communications subsystem for later interpretation by the subsystem for at least one of sends, receives, packs and unpacks, creating a registered DGSP, and interpreting the registered DGSP.

The invention briefly involves taking each datatype encoded in a tree format, and compiling the datatype to a linear format, interpreting that linear format to gather data according to a pattern, concatenate the datatype, and push the datatype out over a communication link, then the contiguous data can come off the link and can be distributed or scattered to destination buffers. Both the send (gather) and receive (scatter) tasks can use the same datatypes. A tree can be analyzed and a DGSP can be created to provide a portable representation of the tree. The present invention uses a MPI_TYPE_COMMIT call to compile and register the DGSP for later use. The DGSP after compile can be executed by the DGSM interpreter. Calls including, for example, MPI_SEND and MPI_PACK, which use datatypes identify the type by its handle. The handle is created by MPCI when the DGSP is registered as part of MPI_TYPE_COMMIT. The DGSP is saved by MPI and passed to MPCI for any of the calls which use the datatype. A subsystem can execute the program as many times as directed in the MPI_SEND and can do this more efficiently than tree traversal. The subsystem does not need any information not encoded in the DGSP, so it does not care where the DGSP was created.

In one embodiment of the present invention, the form of the DGSP uses a single generalized representation. In another embodiment the single generalized representation covers any of the arbitrarily complex datatype patterns that can arise in this context. In yet another embodiment, the single generalized representation provides that any datatype that can be constructed using an application programming interface (API) in MPI can be converted into the form.

In another embodiment of the present invention, the compiling step obviates a need for a set of multiple representations for simple cases together with an inefficient representation for all others.

In one embodiment of the present invention, the DGSP is constructed using relative branch addresses. In an embodiment of the invention, the DGSP can be relocated without need to modify the DGSP. Two or more DGSPs can be concatenated to form a new DGSP, or DGSP fragments can be concatenated without rewrite.

In another embodiment of the present invention, the DGSP is constructed using absolute branch addresses.

In another embodiment of the present invention, the arbitrarily complex datatype is any datatype created by any sequence of calls to MPI datatype constructors and represents any possible layout of data in storage. In another embodiment, the storage includes memory. In another, the storage includes files.

In another embodiment of the present invention, the registering step includes returning a handle identifier for the registered DGSP and wherein the registered DGSP is identified by the handle.

Another embodiment of the present invention is directed to a method for enabling MPI datatype portability including the steps of compiling a tree representation of an MPI datatype into a compact, linear data gather scatter program (DGSP) wherein the DGSP is of a form general enough to encode an arbitrarily complex datatype, sending the form from a first task to a second task, receiving the form at the second task from the first task, and registering the form for later interpretation.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digits in the corresponding reference number.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE INVENTION

The preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Overview of the Invention

Figure 1:
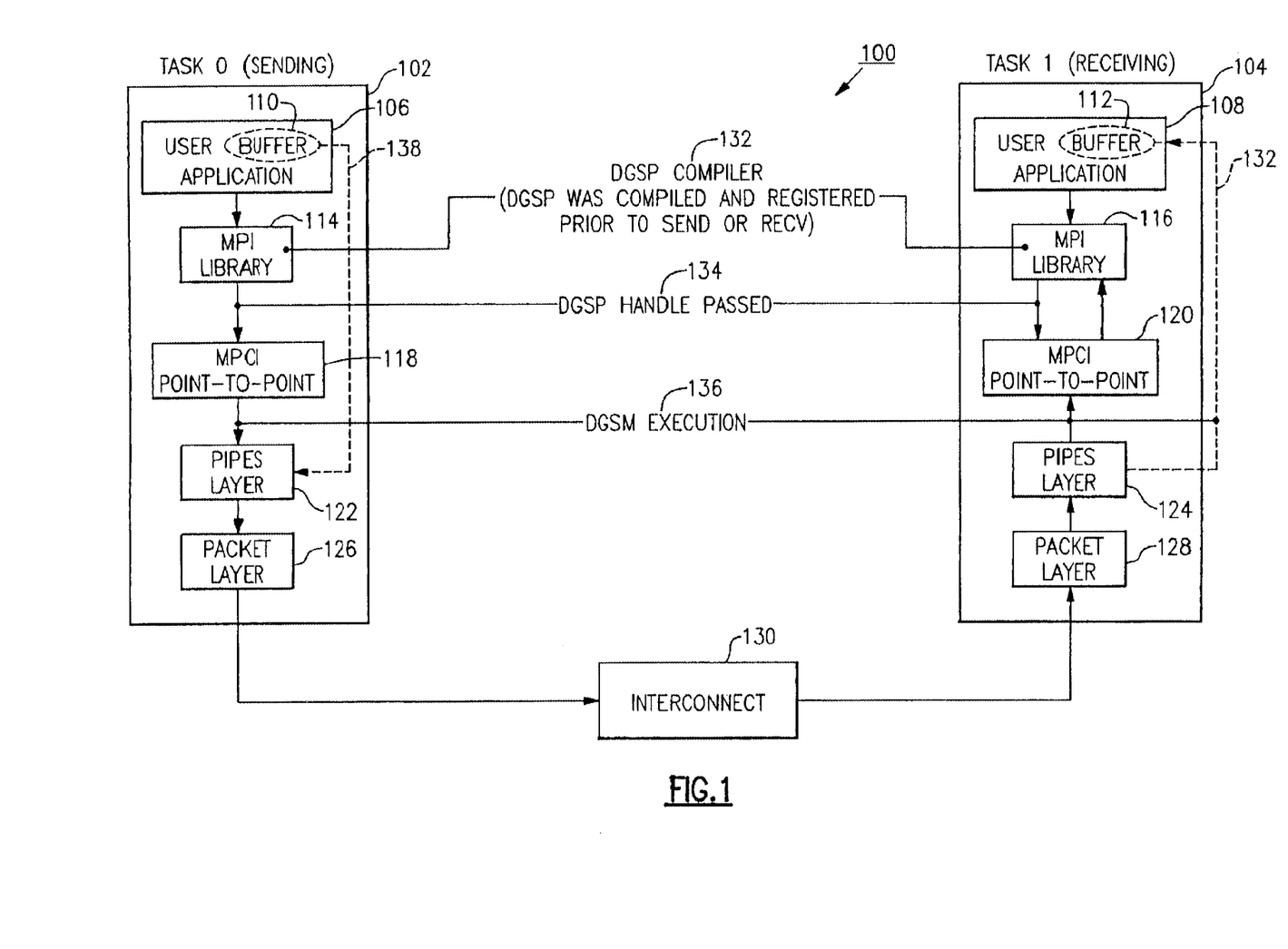
FIG. 1 is a block diagram depicting an exemplary embodiment of a software protocol stack of the present invention including two interconnected tasks in communication.

FIG. 1 is a block diagram 100 depicting an exemplary embodiment of a software protocol stack of the present invention including two interconnected tasks, task 0 102 and task 1 104, in communication. Task 0 102 as shown is sending a message and can be referred to as source task 102. Task 1 104 as shown is receiving a message and can be referred to as destination task 104. Tasks 102 and 104 can be part of an MPI job. Jobs can include various tasks which can all be in communication. Block diagram 100 depicts a two task job in which task 0 102 sends a message and task 1 104 receives the message. The arrows connecting software components 106-128 of the tasks represent the activities of sending and receiving. Every task 102, 104 has the ability to send and to receive. Thus, it will be apparent to those skilled in the art that the lines connecting the software components of tasks 102 and 104, although shown with arrows in only one direction, can more accurately be shown with arrows on both ends since communication is in both directions, since all tasks 102 and 104 can send and receive. However, for illustration purposes, communication will be discussed in only one direction, i.e., from source task 102 to destination task 104, via interconnect 130.

Each task 102, 104 can include several software components 106-128, as shown in diagram 100. The various software components, or software layers 106-128 include communication protocols. Regarding the specific software components, tasks 102 and 104 include user applications 106 and 108, message passing interface (MPI) libraries 114 and 116, message passing client interface (MPCI) point-to-point components 118 and 120, pipes layers 122 and 124, and packet layers 126 and 128, respectively. In one embodiment, MPI libraries 114 and 116, MPCI point-to-point components 118 and 120, pipes layers 122 and 124, and packet layers 126 and 128 are all components of a parallel environment. Lower levels, i.e., MPCI point-to-point components 118 and 120, pipes layers 122 and 124, and packet layers 126 and 128, can in one embodiment be invisible to the user and can be used to carry out transport of data between tasks.

User applications 106 and 108, can include a user's application code used to solve a user's problem. Within user application 106 is data developed at task 102 which needs to be communicated to task 104. The data can reside in a buffer 110 of user application 106. Similarly, user application 108 can include a buffer 112 into which data can be distributed when received by task 104.

MPI libraries 114 and 116 can include a DGSP compiler 132 of the present invention, in one embodiment. The DGSP compiler 132 compiles a data gather/scatter program (DGSP). MPI libraries 114 and 116 can include subroutine or function calls with the prefix "MPI_ . . . " Specifically, MPI libraries 114 and 116 can include, e.g., MPI_INIT, MPI_COMM_RANK, MPI_TYPE_CREATE, MPI_TYPE_VECTOR, MPI_TYPE_CONTIGUOUS, MPI_TYPE_COMMIT, MPI_SEND, MPI_RECV and MPI_FINALIZE. MPI_SEND and MPI_RECV, for example, can cause interpretation, i.e., gathering or scattering of data.

DGSP use in MPI_SEND or MPI_RECV 134 is illustrated as passing a handle or identifier from the MPI libraries 114, 116 to MPCI point-to-point components 118 and 120.

MPCI point-to-point components 118 and 120 can be used to implement a richer interface. Each task 102, 104 is a point. Point-to-point represents that the data of buffer 110 can be sent point-to-point from MPCI 118 to MPCI 120. MPCI point-to-point component 118 can stuff data into pipes of pipes layer 122 as space becomes available, as shown by DGSM execution 136.

Data gather/scatter machine (DGSM) execution 136 is triggered at the boundary between MPCI point-to-point and pipes layer 122. The DGSM is an interpreter as discussed further below. DGSM execution 136 shows that data can be moved between the user application 106 buffer 110 and a pipe. DGSM execution 136 can occur when a point-to-point operation needs to move data from a user's application buffer 110 to the pipes layer.

Piecemeal copy, which is discussed further below, has to do with turning on and off the interface copying data between the user's buffer 110 and pipes layer 122. The DGSM runs for a number of bytes stuffing data from the buffer 110 into pipes 122, and then stops for some time until pipe space is freed up by shipping of data on to the receiving task, and then picks up where it left off.

Pipes layer 122 works with packet layer 126 to provide a reliable byte stream interface for point to point layer 118. Pipes layer 122 invokes DGSM to gather some number of bytes from buffer 110. The data from buffer 110 becomes contiguous bytes in a pipe so packets can be delivered to packet layer 126. When pipes layer 122 confirms that the packets from some portion of the pipe have been delivered, the data in the pipe is no longer needed and DGSM is invoked to gather new data from buffer 110 into the pipe.

Packet layer 126 takes data from pipes of pipes layer 122 and collects the data into packets for shipping to the destination task 104. An example of a type of packet layer is user datagram protocol (UDP). Another is a "user space" mechanism of the IBM RISC System 6000/SP. Various packet layers can be used to transport the data between tasks 102 and 104.

The data in packets can be sent via interconnect 130 to the destination task 104, from source task 102. Interconnect 130 simply describes a means for transferring the data between the tasks. In one embodiment of the invention, a "user space" packet layer 126 can be used to transfer the data between tasks. User space is a mechanism available on the multiprocessor IBM RISC System 6000/SP that provides very high transfer rates. An alternative mechanism for transfer could be user datagram protocol (UDP). UDP provides an unacknowledged datagram capability. Interconnect 130 represents how the data is actually carried from one task to the other including the physical devices and/or interfaces over which the data travels from the source task 103 to reach the destination task 104.

Receipt at destination task 104 includes identical components performing receipt functions. Specifically, packet layer 128 receives packets of data from interconnect 130 and empties the packet contents into the pipes layer 124 which via DGSM execution 136 interfaces with MPCI point-to-point 120 to place the received data into a buffer 112 of user application 108.

It will be apparent to those skilled in the art that the layering system used to describe the present invention is only an example implementation embodiment and the novel technique of the present invention including compiling, saving a DGSP, and interpreting a DGSP, does not require the use of this layered approach. Further, the layered approach disclosed is only one example embodiment of possible layered approaches that would be apparent to those skilled in the art to implement the present invention in view of the disclosure presented herein.

Figure 2:
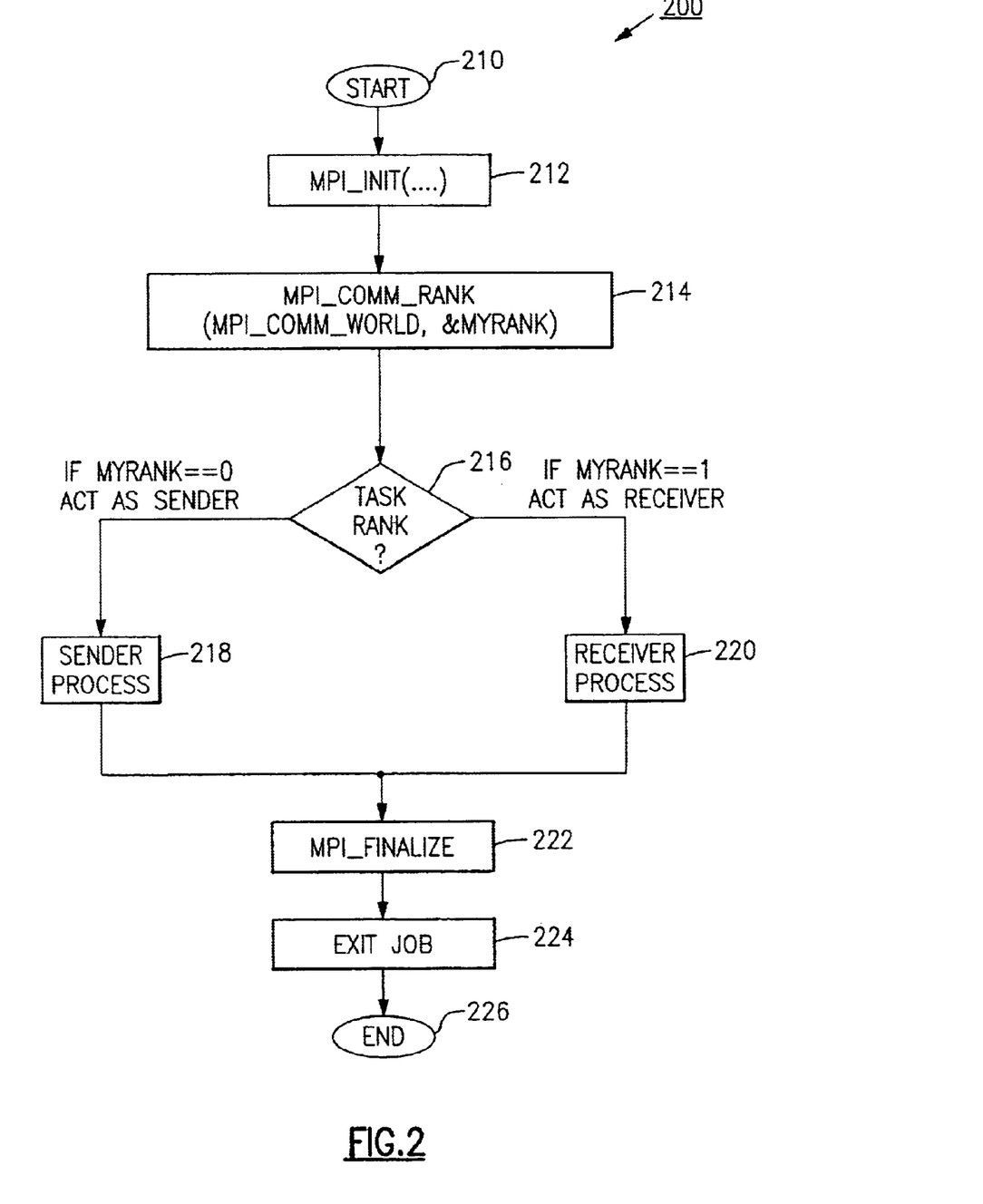
FIG. 2 depicts an example flow diagram depicting a high level flow of user code at sender and receiver tasks including message passing interface (MPI) initialization, determining task rank and gathering and scattering according to an exemplary embodiment of the present invention.

Since a job can include multiple tasks, each task needs to be started and infrastructures for intercommunication as shown in block diagram 100 need to be started. In one embodiment, a user can set up a job by invoking a command. In a Parallel Environment (PE) of an exemplary embodiment of the present invention, a job can be set up to execute a user's application program code including two tasks 102 and 104, by invocation of a command, "poe myprog-procs 2". FIG. 2, below, illustrates a flow diagram of user application code 110 which represents "myprog." It will be apparent to those skilled in the art that the user code can be the same at each task 102, 104 with if-else logic making one task 102 sender and the other task 104 receiver.

FIG. 2 depicts an example flow diagram 200 depicting a high level flow of user code at each task including various steps. Example flow diagram 200 can represent user code in application program "myprog" invoked by the user. The user code, in one embodiment, can be the same at each task.

Specifically, flow diagram 200 can begin with step 210 which can continue immediately with step 212.

In step 212, the task 102, 104 can call a message passing interface (MPI) initialization routine to initialize the MPI environment. From step 212, flow diagram 200 can continue with step 214.

In step 214, tasks 102, 104 can determine the tasks' rank by calling a MPI_COMM_RANK routine. The call returns to each task what the task's rank is, i.e., the task's job assignment. It will be apparent to those skilled in the art, that for a parallel job, a job is broken into several tasks and then the tasks can each be identified by rank. From step 214, flow diagram 200 can continue with step 216.

In step 216, flow diagram 200 can branch according to the rank returned to the tasks 102, 104 in step 214. It will be apparent to those skilled in the art that additional branches can be included if a larger number of tasks are being used in the job. In the illustrated embodiment, since there are only 2 tasks, there are only two branches in step 216. For illustrative purposes, assume that task 0 102 will gather 10,000 integers to send to task 1 104. Further assume that task 1 104 will receive and distribute (i.e., scatter), the 10,000 integers. If the rank, "myrank" is equal to 0, then the task 0 102 can act as a sender (in this example) and flow diagram 200 can continue with step 218. If instead, "myrank" is equal to 1, then the task 1 104 can act as a receiver (in this example) and flow diagram 200 can continue with step 220.

Figure 3:
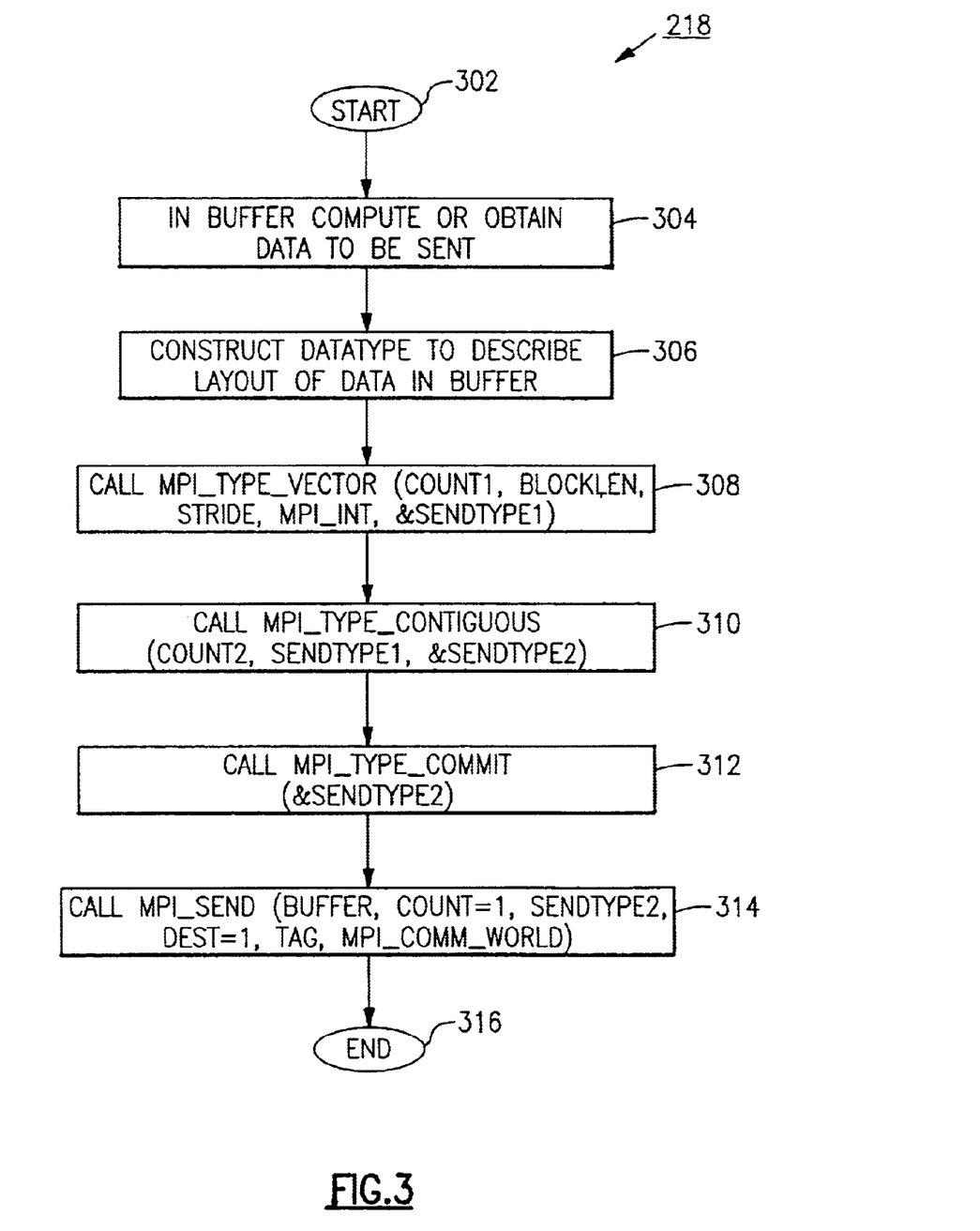
FIG. 3 is a flowchart illustrating a sender task flow including computation or reading of a file, and use of MPI datatype constructors to describe layout of data in a user's buffer, in an exemplary embodiment of the present invention.

In step 218, a sender process can be performed. The sender process performs the functions illustrated on the left half of block diagram 100, including the process of taking data from the buffer of task 102 and sending it to the destination task 104. FIG. 3, discussed further below, is an exemplary embodiment of flow diagram 218, including pseudo-code to illustrate the functions performed. From step 218, flow diagram 200 can continue with step 222.

Figure 4:
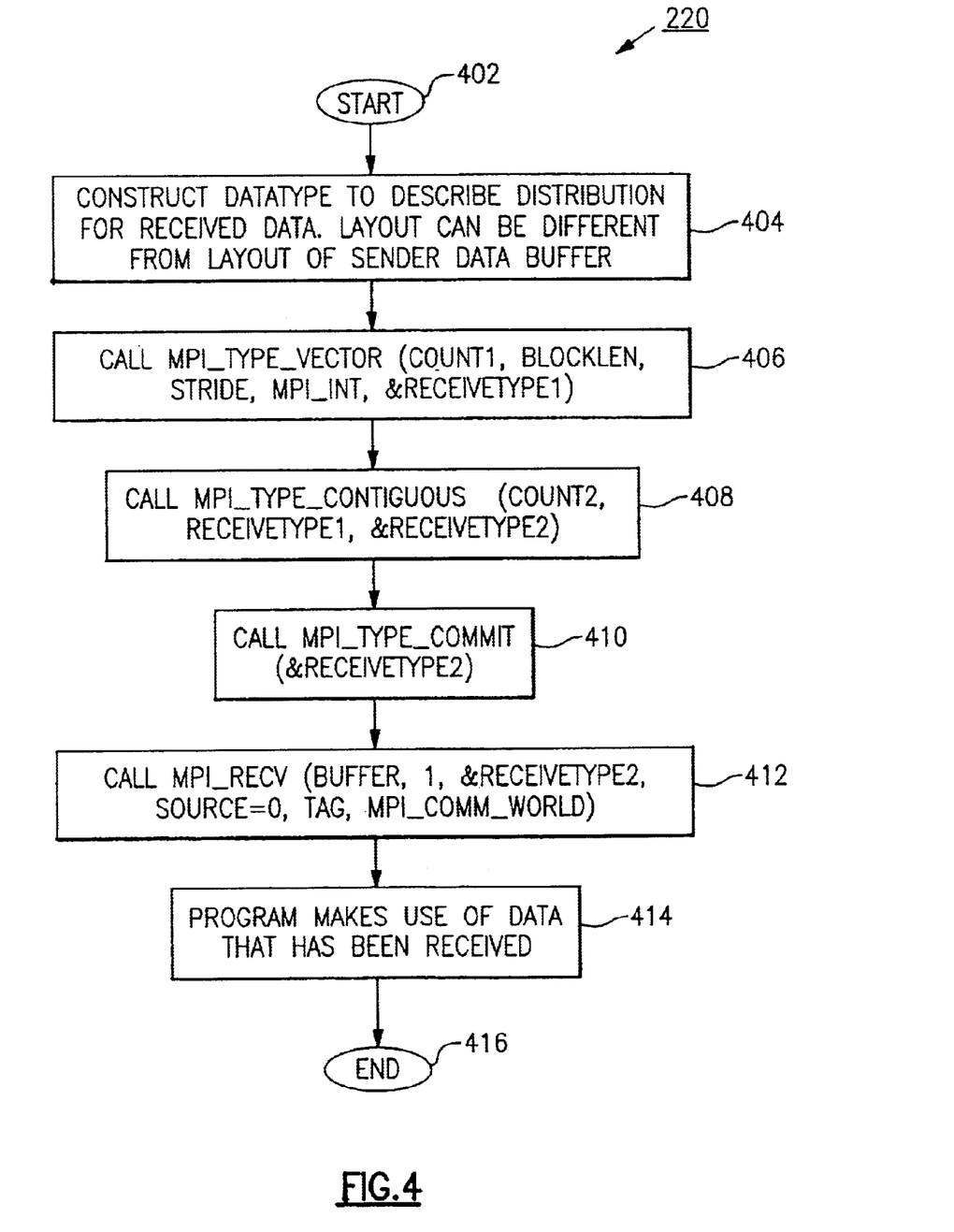
FIG. 4 is a flowchart illustrating a receiver task flow including use of MPI datatype constructors to describe distribution for received data, where the layout can be different from the layout of the sender data buffer, and use by the program of the received data in an exemplary embodiment of the present invention.

In step 220, a receiver role can be performed. The receiving process performs the functions illustrated on the right half of block diagram 100, including receiving data from the task 102 and distributing the data in the destination task 104. FIG. 4, discussed further below, is an exemplary embodiment of flow diagram 220, including pseudo-code to illustrate the functions performed. From step 220, flow diagram 200 can continue with step 222. and gathering and scattering according to an exemplary embodiment of the present invention.

In step 222, tasks 102, 104 can call a finalization routine, MPI_FINALIZE to exit the job. From step 222, flow diagram 200 can continue with step 224.

In step 224, the job can be exited. From step 224, flow diagram 200 can immediately end with step 226.

The present invention includes the ability to directly construct any datatype a user can conceive of, even including recursive constructions including nested datatypes. The DGSP compiler 132 can compile the constructed datatype into a DGSP. The DGSP can be registered using DGSP registration 134. The DGSM is the interpreter of the DGSP. The DGSP is interpreted at DGSM execution 136.

FIG. 3 is a flow diagram 218 illustrating a sender task flow including computation or reading of a file, and use of MPI datatype constructors to describe a layout of data in a user's buffer, in one example embodiment. Flow diagram 218 can begin with step 302 and can continue immediately with step 304.

In step 304, data can be computed or obtained from another location such as from memory and can be placed in the buffer 110 for sending from task 102 to task 104. The task first develops or obtains data before sending data. The data can be a result of a computation or the result of, e.g., reading a file. From step 304, flow diagram 218 can continue with step 306.

In step 306, using MPI type constructors, datatypes can be constructed to describe a layout of the data in buffer 110, which is to be sent. In one embodiment of the invention, step 306 can include several function or subroutine calls. Examples of functions that can be called are included as illustrative steps 308, 310, 312 and 314. From step 306, flow diagram 218 can continue with step 308.

In step 308, the sending task 102 can call a MPI_type_vector function, in one embodiment. By calling the MPI_TYPE_VECTOR function, a datatype can be defined. The parameters of the function include count1 (some number of blocks), blocklen (the length of the blocks), stride (separation between blocks), MPI_INT (the type of datatype included in the new datatype), and &sendtype1 (the new datatype). The & character represents the output of the function. From step 308, flow diagram 218 can continue with step 310.

In step 310, the sending task 102 can call a MPI_TYPE_CONTIGUOUS function, in one embodiment. By calling the MPI_TYPE_CONTIGUOUS function, a datatype can be defined using the new datatype sendtype1 created in step 308. Thus, the datatype construction process is recursive, and can be done to unlimited depth. The parameters of the function include count2 (some number of sendtype1), sendtype1 (the first new datatype, and &sendtype2 (the second new datatype). The & character represents the output of the function. From step 310, flow diagram 218 can continue with step 312.

In step 312, the sending task 102 can call a MPI_TYPE_COMMIT function, in one embodiment. By calling the MPI_TYPE_COMMIT function, the second new datatype senttype2, which will be used in communication, can be committed. It is important to note that there is no need to commit the first new datatype sendtype1, because it is not to be used in communication. The parameter of the function includes &sendtype2 (the second new datatype). The & character represents that it is the output of the function. In this case, sendtype2 is both the input and the output of the commit function. In step 312 is when the DGSP is compiled and registered with MPCI 118, using DGSP compiler 132 and DGSP registration 134. DGSP compiler 132 is discussed further below with reference to Table 8. DGSP registration 134 is discussed further below with reference to Table 2. DGSP registration 134 involves calling MPCI 118 to give MPCI 118 the compiled DGSP from DGSP compiler 132 and requests that MPCI 118 keep it and give back a handle to identify the DGSP. MPCI 118 is the layer which gathers data from the user buffer 110. MPCI 118 is the layer which retains a copy of the DGSP so that when MPI_send (discussed further below with reference to step 314) just passes a handle, the MPCI 118 will have information about the handle. From step 312, flow diagram 218 can continue with step 314.

In step 314, the sending task 102 can call a MPI_SEND function, in one embodiment. By calling the MPI_SEND function, the data can be sent. The parameters of the function include buffer (identifying buffer 110 from which data should be gathered), count=1 (sending one instance), sendtype2 (what the one instance is that is being sent, i.e., the second new datatype), dest=1 (the destination task 104), tag (a message tag used to match a message sent and a message received, chosen by the user), and MPI_COMM_WORLD (indicating the communication space in which communication occurs since MPI permits multiple spaces, so in this case, it is the broadest, i.e., the world). In step 314, MPI_SEND identifies sendtype2 as a datatype. The MPI_SEND can cause MPCI to run the DGSM, i.e. can invoke DGSM execution 136, as a gather machine, gathering data from the user's buffer 110 and stuffing the data into a pipe of pipes layer 122. MPCI runs DGSM execution 135 as a gather machine to interpret sendtype2, previously registered DGSP, that was registered at DGSP registration 134. Data can then be gathered from user buffer 110 and can be pushed into the pipe. DGSM execution 136 is discussed further below with reference to Table 6. From step 314, flow diagram 218 can continue with step 316.

In step 316, flow diagram 218 can immediately end.

FIG. 4 is a flow diagram 220 illustrating a receiver task 104 process flow including use of MPI datatype constructors to describe distribution for received data, where the layout can be different from the layout of the sender task 102 data buffer 110 in an exemplary embodiment of the present invention. Flow diagram 220 can start with step 402 and can continue immediately with step 402. Similar logic can be used in flow diagram 220 as used in sender flow diagram 218, however, data need not be prepared or obtained, since data is being sent to the destination task 104, unlike step 304 of the sending flow diagram 218 of source task 102.

In step 404, a datatype can be constructed to describe distribution for received data at destination task 104 from source task 102. It is important to note that a layout for the received data at destination task 104 data buffer 112 can be different from the layout of the sender task 102 data buffer 110. For example, data that was in a row in source task 102 data buffer 110 can be distributed to a column in destination task 104 data buffer 112. In one embodiment of the invention, step 404 can include various function or subroutine calls 406–412. From step 404, example flow diagram 220 can continue with step 406.

In step 406, the receiving task 104 can call a MPI_TYPE_VECTOR function, in one embodiment. By calling the MPI_TYPE_VECTOR function, a datatype can be defined to describe distribution for the received data from source task 102. The parameters of the function can include count1 (some number of blocks), blocklen (the length of the blocks), stride (separation between blocks), MPI_INT (the type of datatype included in the new datatype), and &receivetype1 (the new datatype). The & character represents the output of the function. From step 406, flow diagram 220 can continue with step 408.

In step 408, the receiving task 104 can call a MPI_TYPE_CONTIGUOUS function, in one embodiment. By calling the MPI_TYPE_CONTIGUOUS function, a datatype can be defined using the new datatype receivetype1 created in step 406. Thus, the datatype construction process can be recursive, and can be done to an unlimited depth. The parameters of the function can include count2 (some number of receivetype1), receivetype1 (the first new datatype), and &receivetype2 (the second new datatype). The & character can represent the output of the function. From step 408, flow diagram 220 can continue with step 410.

In step 410, the receiving task 104 can call a MPI_TYPE_COMMIT function, in one embodiment. By calling the MPI_TYPE_COMMIT function, the second new datatype receivetype2, which will be used in communication, can be committed. It is important to note that there is no need to commit the first new datatype receivetype1, because it is not to be used in communication. The parameter of the function includes &receivetype2 (the second new datatype). The & character represents that it is the output of the function. In this case, receivetype2 is both the input and the output of the commit function. In step 410 is when the DGSP is compiled and registered with MPCI 118, using DGSP compiler 132 and DGSP registration 134. DGSP compiler 132 is discussed further below with reference to Table 8. DGSP registration 134 is discussed further below with reference to Table 2. DGSP registration 134 involves calling MPCI 120 to give MPCI 120 the compiled DGSP from DGSP compiler 132 and requests that MPCI 120 keep it and give back a handle to identify the DGSP. MPCI 120 is the layer which scatters the data or distributes the data to the user buffer 112. MPCI 120 is the layer which retains a copy of the DGSP so that when MPI_RECV (discussed further below with reference to step 412) just passes a handle, the MPCI 120 can have information identified by the handle. From step 410, flow diagram 220 can continue with step 412.

In step 412, receiving task 104 can call a MPI_RECV receive function, in one embodiment. By calling the MPI_RECV function, the data can be received. The parameters of the function can include buffer (identifying buffer 112 to which data should be scattered), count=1 (receiving one instance), &receivetype2 (what the one instance is that is being received, i.e., the second new datatype), source=0 (the source task 102), tag (a message tag used to match a message sent and a message received, chosen by the user), and MPI_COMM_WORLD (indicating the communication space in which communication occurs since MPI permits multiple spaces, so in this case, it is the broadest space, i.e., the world). In step 412, MPI_RECV identifies receivetype2 as a datatype. The MPI_RECV can cause MPCI to run the DGSM, i.e. can invoke DGSM execution 136, as a scatter machine to interpret receivetype2, scattering data to the user's buffer 112 from a pipe of pipes layer 124. MPCI runs DGSM execution 136 as a scatter machine to interpret the previously registered DGSP that was registered at DGSP registration 134. Data can then be scattered to user buffer 112 from the pipe. DGSM execution 136 is discussed further below. From step 412, flow diagram 220 can continue with step 414.

In step 414, the user application program 108 can make use of the data that has been received and distributed into buffer 112. From step 414, flow diagram 220 can continue with step 416.

In step 416, flow diagram 220 can immediately end.

Though both task 102 and task 104 make calls to create a new datatype, i.e., sendtype2 or receivetype2, respectively, these datatypes can represent quite different layouts at each of the tasks 102, 104. The only restriction is that if the MPI_SEND ships "n" number of MPI_INT integers, then the MPI_RECV must define a layout of at least "n" number of MPI_INT, to account for all of the integers being sent. If the send was for 10 integers, the receive must account for at least 10 integers (it would be alright to allow for a receive of 20 and have sent only 10).

The present invention can include essential information abstracted in a compact form called a Data Gather/Scatter Program (DGSP). A DGSP can be interpreted with minimal cache miss because it is compact and contiguous. A DGSP can be delivered to where it is needed because it is also portable. Advantageously, all gathers and scatters which are to be done can use this same form of datatype description.

In one embodiment, the present invention can include the data layout description language data gather/scatter program (DGSP), the compiler 132, which can encode a given MPI datatype tree into a DGSP, and the interpreter 136, which actually gathers or scatters data according to the DGSP that the interpreter 136 is given. The interpreter 136 can be referred to as the data gather/scatter machine (DGSM) processor.

Using the message passing interface (MPI), a user datatype can be constructed using a sequence of type constructor calls. For further information, for example, "Derived Datatypes" and "Datatype Constructors" of the MPI 1.1 standard available at http://www.mpi-forum.org/ sections 3.12 and 3.12.1, the contents of which are incorporated herein by reference in their entireties. Before the constructed datatype can be used for message passing, the datatype is committed by a call to MPI_TYPE_COMMIT. According to the present invention, the compiler can be called to translate the committed constructed datatype into a DGSP. The compiler can use optimization techniques to produce a compact DGSP consistent with the data layout. The optimization techniques can include common subexpression elimination and merging of adjacent blocks in the memory layout.

Subsequently, whenever a request is made to send data from a task 102 to the task 104, using this layout, an interpreter state descriptor can be allocated and bound to the pipe 122 which represents the destination of the send. The state data which represents an active interpreter can be associated with the pipe and can be initialized for a send by providing the DGSP, the buffer address from which the gather is to occur, and a count. There can be many concurrently active interpreters, i.e., up to one per pipe. As space for data becomes available in a pipe buffer, the DGSM code can be called with a pointer to that pipe's DGSM state descriptor and a parameter telling how much data to deliver. DGSM code is reentrant. The DGSM activation runs until it delivers the number of bytes requested and leaves the information about where it should resume in the pipe's DGSM state descriptor. As part of initializing an interpreter for a send pipe, the total number of bytes to be sent can be calculated by multiplying the number of bytes in one instance of the datatype by the count. The pipe code can make as many calls to the DGSM interpreter as needed in order to obtain the total requisite bytes and then can free the interpreter. It will be apparent to those skilled in the art, that all the above concepts also apply to receive wherein bytes are scattered from a pipe rather than gathered into it, but this discussion focuses on send.

The DGSM/DGSP

The DGSM interpreter 136 is a software processor with a small instruction set which fits its purpose. All state data associated with a particular DGSM is bound to a particular pipe. The source language for the compiler 132 is MPI datatype trees which result from nested calls to MPI datatype constructors. The object code is the DGSP which can be interpreted by the DGSM processor 136. The DGSP object code can be interpreted at the task where it is compiled or can be sent to another task and can be interpreted at the receiving task. As object code, a DGSP is read-only. Since a DGSP is read-only and since all state data can be associated with a particular DGSM is bound to a particular pipe, one DGSP can be in concurrent use by multiple send/receive operations.

The small instruction set of the DGSM includes, e.g., copy, gosub, iterate, and control instructions.

The copy instructions can copy (or for MPI_ACCUMULATE, combine) a contiguous block of a given size at a given offset. This instruction can actually cause data to be moved. A copy can be from a user buffer 110 to a pipe buffer of pipes layer 122 when sending, or from a pipe buffer of pipes layer 124 to a user buffer 112 when receiving.

The gosub instruction can create an execution environment (i.e., a new stack frame) for a subroutine of the DGSP. The return address, repetition count, initial offset and stride are all placed in the stack frame before the gosub instruction passes control to the subroutine location. After a number of repetitions specified in the stack frame repetition count, control can return to the DSGP instruction following the gosub instructions.

The iterate instruction can decrement a repetition counter in a current stack frame and can add a stride value to a cursor in the current stack frame. Iterate can reset an instruction counter to execute instructions of a subroutine again if repetitions remain, or can pop the stack frame and branch to the instruction after the gosub instruction.

The control instruction can move DGSM into or out of an accumulate mode. If the control instruction moves the DGSM into accumulate mode, it can provide operational parameters for the accumulate operation. It is permitted for zero to several control's to appear within a single instruction stream data gather scatter program (DGSP). The DGSM can default to copy mode and information from each control can supersede the default or the mode state from the previous control.

Each instruction is represented in a DGSP by a structure which includes the instruction's arguments. The first field of the structure contains an opcode. The remaining fields of the structure are instruction specific. The DGSM interpreter can be written in C and the opcode field can select the clause of a switch statement which is to interpret the current instruction. A DGSP, when it is being stored or shipped to a remote task, can be treated as an array of integers which can be sent just like any other message. The program counter of the DGSM can operate in terms of an offset within the array of integers and all control transfers can be instruction counter relative. This can make a DGSP fragment relocatable.

The control instruction can be used to allow an existing DGSP to be used for MPI_ACCUMULATE without any need to modify the DGSP. Every DGSP can include one or more copy instructions. When a DGSP is used for a send operation the data can be gathered without modification. When a DGSP is used for any receive operation except that which supports MPI_ACCUMULATE, the data can be scattered without modification. Since MPI_ACCUMULATE can have limited use, the DGSM copy instruction can default to performing a copy between pipe buffer and user buffer. Any one sided operation like MPI_ACCUMULATE can require that a DGSP be sent from the origin to the target to drive the target side scatter. By "prepending" a control instruction to a generic DGSP before sending the DGSP to the target of an accumulate, the behavior of the target side copy instruction can be changed so that the copy instruction can use the indicated reduction function in place of a pure copy. The reduction function indicated by a control can be, e.g., "integer add," "floating point multiply," or something else. In one embodiment the reduction operation is represented by the handle of a predefined MPI_OP (i.e., a predefined reduction function). The usual DGSP does not include a control instruction.

Datatype Driven Data Copy—Efficient Data Gather & Scatter via a MPCI/MPI Interface This is a detailed description of an interface between message passing client interface MPCI and message passing interface (MPI) by which all the management of user datatype information can belong to the MPI layer. The mechanism which MPCI uses today to manage MPI datatypes can be replaced to support MPI_PUT, MPI_GET and MPI_ACCUMULATE. The current mechanism is awkward and inefficient for MPI-1 operations. The current mechanism becomes unusable for "MPI-1sided". The 1sided operations can require that a datatype which is defined at the origin task be interpreted at the target. To do this, a representation for datatypes which can be built at one task and delivered in meaningful form to another is used. The current MPCI representation for a datatype is a pointer-linked tree and, therefore is not portable. The current MPI representation is a handle-linked tree and also, not portable. The representation described here is fully portable.

MPCI can include 1 or 2 small (maybe a 200 lines of code long) routine which can implement a "Data Gather or Scatter Machine." The MPCI DGSM 136 can "execute" a "program" compiled by DGSP compiler 132 and the MPI_TYPE_COMMIT 312 routine or by some other MPCI 118 client. The client which compiles a copy description can register 134 that description with MPCI 118, 120. The representation actually used within MPCI can be opaque to a client. MPCI can return a handle by which the client can identify the copy description. MPCI can manage the copy descriptions by reference count. The tools to register the copy description, keep it intact for as long as it is needed, reference it by handle and eventually free it, are in MPCI. The MPCI/MPI interface can support both complex descriptions of nested datatypes and simple predefined datatypes. The new mechanism can be easily extended to carry any additional information that might be needed for data translation in a heterogeneous environment. The present invention treats all blocks of data as being bytes. In many cases it is not necessary to know if an integer or a float is being sent through a communication stack. To support data conversion, the extension can define a distinct copy instruction for each native datatype rather that treating all copies as involving bytes.

MPCI 118 can provide the function of the pseudo code that appears in Table 1, below, in place of the set of MPCI datatype constructor functions now supported.

TABLE 1 enum contig {NONCONTIG,CONTIG,UNIT}
mpci_dcl_copydescr (int len, int depth, long extent, long bytes,
enum contig density, int descr[], MPCI_Datatype *newtype)

| Pseudo-Code | Description |
| --- | --- |
| len (IN) | client indicates how long the description will be (i.e. the size of the descr array) |
| depth (IN) | client says how many iteration levels are in the descriptor |
| extent (IN) | the stride to be use for successive applications of the copy description. |
| bytes (IN) | the number of bytes which will need to copy |
| density (IN) | non-contig or contig or unit (unit means that 2 or more concatenated is still contiguous. For UNIT, extent==bytes) |
| descr[] (IN) | client will build a local copy of the copy descriptor and pass it to MPCI. MPCI will copy the description into an MPCI owned opaque object so client's copy can be disposed. MPCI has the option of analyzing or transforming the version it retains if such actions offer performance benefits. |
| newtype (OUT) | MPCI provided handle for the copy description. Once a copy descriptor is declared it becomes an MPCI opaque object known to the client only by its handle. |

Note:
the parameters: depth and bytes could be derived by MPCI as it stores the descr[] data. They are explicit because MPI already has the info so there seems little reason to rediscover it.

MPCI 118 can provide the same MPCI_SEND 314, and MPCI_RECV 412 functions it does today. The MPCI_datatype argument can be a handle representing the new form of datatype or copy description. MPCI can also provide MPCI_PACK and MPCI_UNPACK functions which utilize copy descriptions rather than the presently used MPCI_ datatypes. This interface eliminates code duplication between MPI and MPCI while allowing each to gather and maintain information needed to fulfill its mission.

The Datacopy Description (Program)

A datacopy description, data gather scatter program (DGSP), and its construction by MPI and registration to MPCI are now described. MPI has the logic to manage all of the datatype constructors defined in the MPI standard. There are uses of MPI_Datatypes which do not involve MPCI but every use of an MPI_Datatype which could involve MPCI demands a committed datatype. The MPI_TYPE_COMMIT call can compile the datacopy description.

The array in which MPI_TYPE_COMMIT compiles the description can be allocated for only the duration of the MPI_TYPE_COMMIT operation. MPCI can copy the description into storage that MPCI can allocate within the MPCI datatype opaque object. It is up to MPCI to preserve its datatype object as long as it needs it. This is no different than what MPCI does today with its current form of datatype object. For this discussion we assume that a copy description is stored, by MPCI, in a "large enough" integer array called prog. Prog, along with other information, can be stored in an MPCI_Datatype object. For example, see the pseudo-code in Table 2, below.

TABLE 2

| Pseudo-Code | Description |
| --- | --- |
| typedef struct {<br>  int   refcount;<br>  ...<br>  enum contig   density;<br>  long   extent;<br>  int   depth;<br>  long   bytes;<br>  int   *prog;<br>} mpci_type_obj; | *prog is the DGS program |

The next three structures illustrated in Table 3, below, represent operations of a DGSP. A DGSP can be built by MPI_TYPE_COMMIT as a concatenation of DGSM instructions which can define the sequence of data copies required. An instruction can be viewed as an opcode with one or more operand. A DGSP can be applied to gather from a user buffer to feed into a pipe for sending tasks, or to distribute into a user buffer as data becomes available from a pipe for receiving tasks. To simplify the discussion, MPCI_SEND can be focused upon which can gather data from the user's buffer according to the datatype and can copy data to the pipe buffer.

TABLE 3

| Pseudo-<br>Code of Structures | Description |
| --- | --- |
| typedef struct {<br>  int opcode;<br>  int target;<br>  int repetitions;<br>  long   offset;<br>  long   stride;<br>} gosub_t;<br>typedef struct {<br>  int opcode;<br>  long   offset;<br>  long   byte_count;<br>} copy_t;<br>typedef struct { | will be GOSUB; subroutine at prog[target]<br><br><br><br><br><br>will be COPY; |

TABLE 3-continued

| Pseudo-<br>Code of Structures | Description |
| --- | --- |
|   int opcode;<br>  int index;<br>} iterate_t;<br>typedef struct {<br>  int   opcode;<br>  int   red_op;<br>  int   type;<br>} control_t; | ITERATE; branch to prog[index] if another iteration<br><br><br>will be CONTROL handle of MPI predefined<br>reduction op handle of MPI predefined datatype |

The datatype descriptions created by the MPI_Datatype constructor functions are well-behaved tree structures. Such structures can be converted to an "object" code form which can be executed by a software "processor" using a stack to manage nested loops. A recursive descent parser within MPI can be used to compile a DGSM "program" from such a tree.

Another example of how implementation is simplified is that the instruction set of the DGSM is small. A simple boot sequence can be provided by the DGSM interpreter 136 to deal with the count value of MPCI routines. This boot sequence can create a base stack frame which can cause the datacopy program to be iterated the value of count times. There is no need to adjust the compiled representation for different counts.

Another example is that the DGSM stack for any execution can be made of a number of identical frames making pushing, popping and backchaining trivial. Each compiled datacopy structure can specify the stack depth required to execute it so MPCI stack allocation is clean and overflow checking unneeded.

Another example is that any MPCI client which does not use a recursive concept for data buffer definition can describe its non-contiguous data copy needs by a one level copy description which includes one or more COPY instructions and an ITERATE(0) as an end marker.

The Data Gather & Scatter Machine Interpreter

In one embodiment of the invention, the DGSM 136 includes a stack and a few state variables including a stack pointer and instruction counter. The code can include a switch statement inside a loop. In a hardware processor, a series of instructions can be executed. Each instruction is typically at an address. The processor interprets each instruction, and then automatically goes on to the next instruction, unless it reaches a branch. DGSM 136 is a machine implemented in software. The instruction counter indicates the current interpreted instruction and by default advances to the next instruction when the current one completes. Instructions are well defined. The DGSM can be used to gather data from a memory buffer 110 to feed out over a communications link. The DGSM processor 136 can understand four instructions, copy, gosub, iterate and control. The DGSM 136, by default, goes linearly through the instructions.

Each stack frame can include local variables such as, e.g., those shown in Table 4, below.

TABLE 4

| Local Variable | Description |
| --- | --- |
| offset | cumulative offset from lower levels |
| return | next instruction at caller |
| reps | how many times this level is to iterate |
| stride | a value to add to the cursor each iteration |

TABLE 4-continued

| Local Variable | Description |
| --- | --- |
| cursor | an address in the dispersed copy of the data, (the stride is added to the cursor each iteration) |

The initial frame can be created with pseudo-code such as, e.g., that shown in Table 5, below.

TABLE 5

| Pseudo-Code | Description |
| --- | --- |
| offset = 0; | a call like MPCI_SEND has no offset |
| return = −1; | return at this level is exit |
| reps = count; | count arg of MPCI_SEND call |
| stride = extent; | from datatype specified to MPCI_SEND |
| cursor = bufptr; | buffer arg of MPCI_SEND call |

Before calling on the DGSM, MPCI can evaluate whether MPCI can use shortcut logic which is better for moving contiguous data. If (e.g., count=1 and density=CONTIG) or density=UNIT, then MPCI can simply trigger a copy of (count * bytes) contiguous bytes. If desirable, user buffer can be attached directly as the pipe. If, instead calling a block copy is preferable, then that can be done.

If the data to be copied is not contiguous, the DGSM can be started. The depth value in the datatype can be used by MPCI to select or allocate a stack of suitable size. The stack can be inited, i.e., initialized the DGSM's Instruction Counter can be set to ic=0 which can address the first instruction at prog[ic] and the DGSM loop can be entered. The DGSM loop can interpret the opcode at prog[ic] as the selector for a clause of the switch statement. Each clause can cast the address of prog[ic] to a structure pointer of appropriate type for that clause so that the operands can be accessed.

The DGSM instruction set can be interpreted, e.g., as shown by the pseudo-code depicted in Table 6 below.

TABLE 6

| Pseudo-Code | Description |
| --- | --- |
| for (done=FALSE; not done;) { switch(prog[ic]) { case GOSUB: return = ic + sizeof(gosub_t)/ sizeof (int); reps & stride are provided by the GOSUB cursor is copied from the old frame to the new offset in new frame = offset in old + offset from GOSUB ic = target from GOSUB break | Operands: target, reps & stride Push new stack frame & set its variables |
| case COPY: [SEE NOTE BELOW TABLE 6] copy byte_count bytes from user buffer's to destination (pipe buffer) ic += sizeof(copy_t)/sizeof(int); break | Operands: offset & bytes User buffer point will be (cursor+COPY.offset+stack. offset) |
| case ITERATE: decrement stack_top.reps if (stack_top.reps==0) { if(stack_top.return == −1) done = TRUE; else ic = stock_top.return; pop stack; } else { cursor += stack_top.stride; | Operand: branch_to index |

TABLE 6-continued

| Pseudo-Code | Description |
| --- | --- |
| ic = ITERATE.index; } case CONTROL: set mode according to instruction if setting to ACCUM mode save MPI_Datattype and MPI_Op } } | Operands: mode, MPI_Datatype, MPI_Op Branch to instruction which copies more data. |

NOTE: It is important to note that for a receive one could have gotten a control instruction. If so, one would be in an ACCUM mode and rather than "copy" one would call accum(pipe_ptr, buf_ptr, bytes, mpi_datatype, mpi_reduce_op) to combine incoming data with data in buffer. (Also, accum function always processes an integral number of datatype elements so it may not process all bytes it is called for. If passed 30 bytes to accumulate as 4 byte integers, accum will not process the last 2 bytes. The pipe implementation is able to retain unprocessed bytes until more data arrives. Next accum() call will be given the left over bytes again along with some more.)

The simplest prog for non-contiguous data is: "COPY(0, n), ITERATE(0)". This example is for a count greater than 1 on any contiguous datatype of n bytes which requires alignment padding when concatenated. It does not matter how complex the underlying type tree is if the type is contiguous. The MPI_Type_commit compiler 132 can fold contiguous copies into a single longer copy instruction. For example, a contiguous, but not unit, datatype of "{f0,intg} {f4,floatg} {f8,charg} {f9,charg} {f12,ubg}" could be described by a prog of"COPY(0,10), ITERATE(0)". The depth of this prog is 1 and the extent is 12. A straight forward compilation for this prog can produce "COPY(0,4), COPY (4,4), COPY(8,1) COPY(9,1) ITERATE(0)" Because MPI may have logic to detect contiguous datatypes, the simpler version can actually be generated.

Every prog can end in an ITERATE(0) instruction which can operate against the base stack frame initialized with count. Each time an ITERATE is executed it can decrement the count in the current stack frame and when count decrements to zero, the return address can be taken from the frame which can then be popped. After count iterations, the end-mark ITERATE(0) can find the return address in the base stack frame to be −1 and the job can be done.

Piecemeal Copying

The DGSM within MPCI can deal well with a "copy next n bytes" interface. An mpci_send with a noncontiguous datatype and a large buffer is handled piecemeal. The mpci_send is represented by a send descriptor which can get bound to a pipe until all the data it represents is sent. Low level code in MPCI can detect pipes which have space available and pending sends. The low level code can deal with each such case by calling writedatatopipe(pipe,msg descr,avail space) which can use information in the send_msg_descr to copy the lesser of, the remaining data or the amount of data which can fit the pipe. Each call to writedatatopipe can pick up where the previous call for that send_msg_descr left off. There can be many incomplete sends at any time and each can be asked to make some specified progress by a writedatatopipe call before returning to the sidelines. Progress on the sends can be asynchronously interleaved.

If the DGSM is such that its stack and state variables are within the send descriptor and the DGSM code is reentrant, any desired number of send requests can be kept active and can be driven by writedatatopipe calls. The support for writedatatopipe can include changing a few lines of code in the COPY clause of the DGSM case statement to recognize copies which cannot be fully executed because doing so could overflow the avail space as well as code to finish incomplete copies. In the first case, the COPY operation could deliver what was invited and suspend itself by setting bytes left to copy and resume address, in the send descriptor, to the number of bytes remaining in that COPY. In the second, it could continue the outstanding COPY. Since the DGSM instruction counter is not updated until a COPY is complete, reentry of the DGSM with a COPY in process can go directly to the COPY clause. At the time the send descriptor is created, the DGSM instruction counter and bytes left to copy can be set to zero.

When the DGSM for piecemeal copying is executed, it can be given avail space as a parameter and it can adjust toward 0 in each COPY operation. To operate within the avail space constraint, the pseudo-coded COPY clause from the DGSM above can become, e.g., as shown in Table 7, below.

TABLE 7

| Pseudo-Code | Description |
| --- | --- |
| case COPY:<br>  If (bytes_left_to_copy) {<br>    if (bytes_left_to_copy <= avail_space) {<br>      copy bytes_left_to_copy bytes from<br>resume_address;<br>      avail_space -= bytes_left_to_copy;<br>      bytes_left_to_copy = 0;<br>    } else {<br>      copy avail_space bytes from resume_address;<br>      bytes_left_to_copy -= avail_space;<br>      resume_address += avail_space;<br>      return from writedatatopipe;<br>    }<br>  } else {<br>    if (COPY.byte_count ? avail_space) {<br>      copy avail_space bytes;<br>      bytes_left_to_copy = byte_count - avail_space;<br>      resume_address = cursor + COPY.offset +<br>stack_top.offset + avail_space;<br>      return from writedatatopipe;<br>    } else {<br>      copy byte_count bytes from user buffer's to<br>destination<br>    }<br>  }<br>  ic += sizeof(copy_t)/sizeof(int);<br>  break<br>      cursor += stack_top.stride;<br>      ic = ITERATE.index;<br>    }<br>  }<br>} | Operands:<br>off-set &<br>byte—count<br><br><br><br><br><br><br><br><br><br><br><br>New COPY<br>- user buffer<br>start is at<br>(cursor+<br>COPY.off-<br>set+stack_<br>top.offset)<br><br><br>ic+=3 |

The DGSP Compiler

Table 8, below illustrates example pseudo-code for a DGSP compiler 132 of an example embodiment of the present invention. The DGSP compiler 132 in MPI can have two passes. Each pass can use a recursive walk of the MPI type tree. In the first pass, a mapper can use a breadth first traversal to determine how much space in prog is needed for each node of the type tree. Since the mapper traversal is breadth first, it can discover how much space is needed at each level before it begins to analyze a deeper level. This can allow mapper to allocate space in prog for each level as it is analyzed. The determination for a given level can be quite simple. An MPI_Datatype can be made of 1 or more blocks and the datatype object can contain one descriptor for each block. Each block can have a single COPY or a single GOSUB instruction in the prog. For a block which is contiguous, a COPY can be used and for one which is not, a GOSUB can be used. The main program as well as each subroutine can end in an ITERATE which can double duty as a return.

When the mapper visits a type tree node for the first time in a given MPI_TYPE_COMMIT compilation it can record in that node, the index at which its subroutine can be generated by the codegen pass. Once mapper visits a node, all future visits by mapper can detect that subroutine space is already allocated for the node and need not allocate more. This can be done by using a global counter which can be incremented each compilation pass through the life of an MPI job. When a node is visited and is already stamped with the current pass number it need not be processed again. If its pass number is old, the node can be processed and stamped. Every reference to a particular subtype, found in the type being compiled, can use the same subroutine in the prog.

Before the codegen pass, a prog array of the size determined by mapper can be allocated. The codegen pass will begin to generate code from the node on which MPI_TYPE_COMMIT was called. For a contiguous block, codegen can generate a COPY instruction. For a noncontiguous block codegen will generate a GOSUB instruction. The location of the target instruction for the GOSUB was already assigned by mapper and recorded in the subtype object. After each GOSUB has been inserted, a recursive call to codegen can generate the subroutine code if not already done.

TABLE 8

| Pseudo-Code | Description |
| --- | --- |
| MPI_Type_commit(MPI_Datatype type) {<br>  dt_serial_num++;<br>  maxdepth = 0; depth = 0;<br>  ic = 0;<br>  mapper(type, &ic, &maxdepth, &depth);<br>  len = ic;<br>  prog = malloc(ic * sizeof(int));<br>  dt_serial_num++;<br>  codegen(type, prog);<br>  mpci_dcl_copydescr(len, gdepth, extent(type),<br>    packsize(type), density(type), prog, *newtype );<br>  record newtype handle in datatype obj;<br>  free(prog);<br>  mark type committed;<br>}<br>mapper(MPI_Datatype datatype, int *nas, int<br>*mdepthp, int *depthp) {<br>  record dt_serial_num and next available space in<br>datatype obj;<br>  (*depthp)++;<br>  *mdepthp = max(*mdepthp,*depthp);<br>  for each block {<br>    if ((subtype.is_unit) or (reps==1 and<br>subtype.is_contig)<br>      *nas += sizeof(copy_t)/sizeof(int);<br>    else<br>      *nas += sizeof(gosub_t)/sizeof(int);<br>  }<br>  *nas += sizeof(iterate_t)/sizeof(int);<br>  for each block {<br>    if (serial_num in subtype != dt_serial_num)<br>    and ( not(subtype.is_unit or (count==1 and<br>subtype.is_contig)) )<br>      mapper(subtype, nas, mdepthp, depthp);<br>  }<br>  (*depthp)--;<br>}<br>codegen(type,prog) {<br>  record dt_serial_num in datatype obj<br>  local_ic = nas recorded in datatype obj by<br>  mapper for each block {<br>    if ((subtype is_unit) or (reps==1 and<br>subtype.is_contig) {<br>      make a COPY instruction at prog[local_ic]<br>        COPY.byte_count = reps *<br>extent(subtype)<br>        COPY.offset = subtype.offset<br>        local_ic += sizeof(copy_t)/sizeof(int) | A global variable<br>maxdepth & depth<br>are local<br><br><br><br>codegen needs a<br>new<br>dt_serial_number<br><br><br><br>prog can be kept for<br>use in building<br>IO-vectors<br><br><br><br>nas is where the<br>subroutine will be<br>compiled in pass<br>two<br><br>subtype, reps and<br>offset information<br><br><br>current level now<br>fully mapped<br><br>prevents mapping<br>same thing twice<br><br><br><br><br><br><br><br>we have a subtype,<br>reps and offset<br>information |

TABLE 8-continued

| Pseudo-Code | Description |
|---|---|
| ``` } else {     make a GOSUB instruction at prog[local_ic]       GOSUB.target = subtype.nas       GOSUB.offset = block.offset       GOSUB.reps = block.reps       GOSUB.stride = subtype.extent;     local_ic += sizeof(gosub_t)/sizeof(int)     If(subtype.serial_num != dt_serial_num)       codegen(subtype,prog);   } }   Make an ITERATE at prog[local_ic]     ITERATE.index = nas recorded in datatype obj by mapper } ``` | compile subtype if not done before |

In an example embodiment of the present invention, the platform can be any computer on which multiple processes can be run to exploit multiple processors which may not have access to a single common address space. It will be apparent to those skilled in the art that implementation is not limited to such an exemplary platform.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for communicating a representation of any MPI datatype, the method comprising the steps of:
   (a) compiling a tree representation of an MPI datatype into a compact, linear data gather scatter program (DGSP), wherein said DGSP specifies processing to access data according to a layout defined by the MPI datatype;
   (b) registering said compact linear DGSP with a communications subsystem, thereby creating a registered DGSP;
   (c) communicating a data item over an interconnect, wherein the data item has a structure defined by the MPI datatype and wherein the step of communicating comprises the step of accessing a buffer containing the data item and wherein the accessing comprises the step of interpreting said registered DGSP;
   wherein the DGSP uses a single generalized representation; and
   wherein said single generalized representation provides that any datatype that can be constructed using an application programming interface (API) in said MPI datatype can be converted into said DGSP.

2. The method of claim 1, wherein said step (a) obviates a need for a set of multiple representations for simple cases together with an inefficient representation for all others.

3. The method of claim 1, wherein said DGSP is constructed using relative branch addresses.

4. The method of claim 3, wherein said DGSP can be relocated.

5. The method of claim 1, wherein said DGSP is constructed using absolute branch addresses.

6. The method of claim 1, wherein said arbitrarily complex datatype is any datatype created by any sequence of calls to MPI datatype constructors and represents any possible layout of data in storage.

7. The method of claim 6, wherein said storage includes memory.

8. The method of claim 6, wherein said storage includes files.

9. The method of claim 1, wherein said step (b) includes returning a handle identifier for said registered DGSP and wherein said registered DGSP is identified by said handle identifier.

10. The method of claim 1, further comprising the step of creating the MPI datatype by calling at least one function to define at least one sub-datatype, wherein the MPI datatype comprises the at least one sub-datatype.

11. The method of claim 1, wherein the step of compiling comprises at least one of common subexpression elimination and merging of adjacent blocks in the memory layout.

12. The method of claim 1, wherein said compact linear DGSP comprises at least one command and wherein the at least one command is used in performing the step of accessing the buffer.

13. The method according to claim 12, wherein the at least one command comprises a command that specifies accessing data located at a given offset.

14. The method of claim 13, wherein the given offset is a relative offset, wherein the relative offset specifies an offset relative to another data item within the buffer.

15. A method for enabling MPI datatype portability, the method comprising the steps of:
   (a) compiling a tree representation of an MPI datatype into a compact, linear data gather scatter program (DGSP); wherein said DGSP specifies processing instructions used to access data according to a layout defined by the MPI datatype and wherein said DGSP is of a form general enough to encode an arbitrarily complex datatype;
   (b) sending said DGSP from a first task to a second task;
   (c) receiving said DGSP at said second task from said first task;
   (d) registering said DGSP for later use in accessing a data buffer;
   wherein the DGSP uses a single generalized representation; and
   wherein said single generalized representation provides that any datatype that can be constructed using an application programming interface (API) in said MPI datatype can be converted into said DGSP.

16. A data gatherer/scatterer machine, comprising:
   a compiler for compiling a tree representation of an MPI datatype into a compact, linear data gather scatter program (DGSP) wherein said DGSP is of a form general enough to encode an arbitrarily complex datatype;
   a data gather scatter machine for registering said compact linear DGSP with a communications subsystem and for interpreting said registered DGSP;
   an interconnect for communicating a data item over an interface, wherein the data item has a structure defined by the MPI datatype and wherein the communicating comprises accessing a buffer containing the data item, wherein the accessing is performed in conjunction with data produced by the interpreting of said registered DGSP;
   wherein the DGSP uses a single generalized representation; and
   wherein said single generalized representation provides that any datatype that can be constructed using an application programming interface (API) in said MPI datatype can be converted into said DGSP.

* * * * *